(12) United States Patent
Yun et al.

(10) Patent No.: US 12,554,130 B2
(45) Date of Patent: Feb. 17, 2026

(54) COMPACT HEADS-UP DISPLAY

(71) Applicant: 3M INNOVATIVE PROPERTIES COMPANY, St. Paul, MN (US)

(72) Inventors: Zhisheng Yun, Sammamish, WA (US); Stephen J. Willett, St. Paul, MN (US); Craig R. Schardt, Woodbury, MN (US); Gilles J. Benoit, Minneapolis, MN (US); Keith M. Kotchick, St. Paul, MN (US); Ryan C. Shirk, Mendota Heights, MN (US); David A. Rosen, North St. Paul, MN (US); Hao Wu, Shanghai (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 924 days.

(21) Appl. No.: 17/595,046

(22) PCT Filed: Jun. 6, 2019

(86) PCT No.: PCT/CN2019/090270
§ 371 (c)(1),
(2) Date: Nov. 8, 2021

(87) PCT Pub. No.: WO2020/243939
PCT Pub. Date: Dec. 10, 2020

(65) Prior Publication Data
US 2022/0197024 A1 Jun. 23, 2022

(51) Int. Cl.
*G02B 27/01* (2006.01)
*G02B 5/30* (2006.01)
*G02B 27/28* (2006.01)

(52) U.S. Cl.
CPC ....... *G02B 27/0101* (2013.01); *G02B 5/3066* (2013.01); *G02B 27/286* (2013.01); *G02B 2027/011* (2013.01); *G02B 2027/0118* (2013.01)

(58) Field of Classification Search
CPC .............. G02B 5/3066; G02B 17/0615; G02B 17/0621; G02B 17/0636; G02B 17/0642;
(Continued)

(56) References Cited

U.S. PATENT DOCUMENTS 4,799,765 A   1/1989  Ferrer
5,882,774 A * 3/1999  Jonza .................. G02B 5/3083
                                                428/522
(Continued)

FOREIGN PATENT DOCUMENTS

CN    107045199    8/2017
CN    206627701    11/2017
(Continued)

OTHER PUBLICATIONS

Extended European Search Report for 19931981.5, mailed on Dec. 2, 2022, 10 pages.
(Continued)

*Primary Examiner* — Nicholas R. Pasko
(74) *Attorney, Agent, or Firm* — Jonathan L. Tolstedt (57) ABSTRACT

An optical system includes a reflective polarizer (20), and a display (10), first mirror (30a), and second mirror (30b) disposed on a same side of the reflective polarizer (20). The reflective polarizer (20) transmits an image emitted by the display (10) after the image is reflected by the first and second mirrors (30a, 30b). A mid-plane defined by intersection points between an optical axis of the system and the display (10), reflective polarizer (20), and second mirror (30b) has one-pass through four-pass regions having respec-
(Continued)

tive areas, A1 through A4. The one-pass region includes portions of the emitted image rays (15) that pass at least one time across the one-pass region, the two-pass region includes portions of the image rays (15) that pass at least two times across the two-pass region, the three-pass region includes portions of the image rays (15) that pass at least three times across the three-pass region, and the four-pass region includes portions of the image rays (15) that pass four times across the four-pass region, such that the ratio A4/A3 is between approximately 0.15 and approximately 0.40.

17 Claims, 10 Drawing Sheets

(58) Field of Classification Search
CPC ............ G02B 17/0657; G02B 17/0663; G02B 27/0101; G02B 27/28; G02B 27/283; G02B 27/286; G02B 2027/011; G02B 2027/0118
See application file for complete search history.

(56) References Cited

U.S. PATENT DOCUMENTS

| | | |
|---|---|---|
| 9,823,472 B2 | 11/2017 | Kim |
| 11,169,377 B1 * | 11/2021 | Chen .................. G02B 27/0101 |
| 11,402,633 B2 | 8/2022 | Hong |
| 12,025,797 B2 * | 7/2024 | Yun .................. G02F 1/133536 |
| 2006/0007055 A1 | 1/2006 | Larson |
| 2007/0229394 A1 * | 10/2007 | Ishikawa ............ G02B 27/0101 345/7 |
| 2015/0213320 A1 | 7/2015 | Ookawara |
| 2016/0195727 A1 * | 7/2016 | Kuzuhara .............. B60K 35/60 359/633 |
| 2017/0248786 A1 * | 8/2017 | Kuzuhara .............. B60K 35/60 |
| 2017/0269428 A1 * | 9/2017 | Otani .................. G02B 6/0055 |
| 2017/0315351 A1 | 11/2017 | Yamazoe |
| 2018/0088325 A1 | 3/2018 | Brown |
| 2018/0164585 A1 | 6/2018 | Nambara et al. |
| 2019/0056575 A1 | 2/2019 | Yonetani |
| 2019/0255946 A1 * | 8/2019 | Takahashi .......... G02B 17/0668 |
| 2019/0255947 A1 * | 8/2019 | Takahashi .......... G02B 27/0149 |
| 2019/0258059 A1 * | 8/2019 | Takahashi .............. B60K 35/60 |
| 2020/0070729 A1 * | 3/2020 | Imamura .............. G02B 5/3025 |
| 2021/0033863 A1 * | 2/2021 | Hong ..................... B60K 35/81 |
| 2021/0191116 A1 | 6/2021 | Shi |
| 2021/0311301 A1 * | 10/2021 | Imamura .............. G02B 5/3083 |

FOREIGN PATENT DOCUMENTS

| | | |
|---|---|---|
| CN | 208921975 | 5/2019 |
| JP | 2004226469 A | 8/2004 |
| JP | 2018081276 A | 5/2018 |
| JP | 2020037379 A | 3/2020 |
| WO | WO 2020-128841 | 6/2020 |

OTHER PUBLICATIONS

International Search report for PCT International Application No. PCT/CN2019/090270, mailed on Mar. 6, 2020, 5 pages.

* cited by examiner

COMPACT HEADS-UP DISPLAY

SUMMARY

In some aspects of the present description, an optical system is provided, including a reflective polarizer, and a display, a first mirror, and a second mirror disposed on a same side of the reflective polarizer. For normally incident light and for at least one wavelength in a range extending from about 450 nm to about 600 nm, the reflective polarizer transmits at least 80% of the incident light having a first polarization state and reflects at least 80% of the incident light having an orthogonal second polarization state, and each of the first and second mirrors reflects at least 80% of the incident light for at least one of the first and second polarization states. The display is adapted to emit an image for viewing by a viewer, the emitted image being transmitted by the reflective polarizer after being reflected once by each of the first and second mirrors. The optical system has an optical axis, and an image ray emitted by the display and propagating along the optical axis is substantially normally incident on the first mirror after being reflected by the reflective polarizer and the second mirror. A midplane is defined by intersection points between the optical axis and the display, the reflective polarizer, and the second mirror. The midplane has one-pass through four-pass regions having respective areas, A1 through A4. For image rays emitted from the display and propagating along and in the midplane, and prior to being incident on the reflective polarizer for a second time: the one-pass region includes portions of the emitted image rays that pass at least one time across the one-pass region, the two-pass region includes portions of the emitted image rays that pass at least two times across the two-pass region, the three-pass region includes portions of the emitted image rays that pass at least three times across the three-pass region, and the four-pass region includes portions of the emitted image rays that pass four times across the four-pass region, such that the ratio A4/A3 is between approximately 0.15 and approximately 0.40.

In some aspects of the present description, an optical system in provided, including a display, a reflective polarizer, a first mirror, and a second mirror generally disposed on different side-faces, and between opposing parallel end-faces, of a right rectangular prism and facing an interior space of the right rectangular prism. An image emitted by the display may be transmitted by the reflective polarizer for viewing by a viewer after the emitted image is reflected by each of the reflective polarizer and the first and second mirrors.

In some aspects of the present description, an optical system is provided, including a reflective polarizer, and a display, a first mirror, and a second mirror disposed on a same side of the reflective polarizer. For normally incident light and for at least one wavelength in a range extending from about 450 nm to about 600 nm, the reflective polarizer transmits at least 80% of the incident light having a first polarization state and reflects at least 80% of the incident light having an orthogonal second polarization state, and each of the first and second mirrors reflects at least 80% of the incident light for at least one of the first and second polarization states. The display is adapted to emit a central image ray, which propagates along and in a central plane and which is transmitted by the reflective polarizer for viewing by a viewer after being reflected once by each of the first and second mirrors. The central plane includes third-pass and four-pass regions having respective areas A3 and A4. For emitted image rays emitted from the display and propagating along and in the central plane, and prior to being incident on the reflective polarizer for a second time: the three-pass region includes portions of the emitted image rays that pass at least three times across the three-pass region, and the four-pass region comprises portions of the emitted image rays that pass four times across the four-pass region, such that the ratio A4/A3 is between approximately 0.15 and approximately 0.40.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

According to some aspects of the present description, an optical system (e.g., a compact heads-up display) may include a reflective polarizer, and a display, a first mirror, and a second mirror disposed on a same side of the reflective polarizer. For normally incident light and for at least one wavelength in a range extending from about 450 nanometers (nm) to about 600 nm, the reflective polarizer may transmit at least 80% of the incident light having a first polarization state and may reflect at least 80% of the incident light having an orthogonal second polarization state. For example, the reflective polarizer may allow at least 80% of light with an s-type linear polarization to pass through (i.e., be transmitted), and reflect at least 80% of light with a p-type linear polarization. In another example, the reflective polarizer may substantially transmit p-polarized light and substantially reflect s-polarized light. In some example embodiments, the reflective polarizer may be a multilayer optical film.

Each of the first and second mirrors may reflect at least 80% of the incident light for at least one of the first and second polarization states. In some embodiments, one or both of the first and second mirrors may substantially reflect all incident light, regardless of the polarization of the light. In some embodiments, one or both of the first and second mirrors may substantially reflect all incident light in the first polarization state, and substantially transmit incident light in the second polarization state. In some embodiments, one or both of the first and second mirrors may substantially reflect all incident light in the second polarization state, and transmit incident light in the first polarization state.

In some embodiments, at least one of the reflective polarizer, the first mirror, and the second mirror may be curved to provide some amount of optical power to the projected image. In some embodiments, the curved surfaces may be spherical, aspherical, free-form (i.e., a non-rotationally symmetric surface featuring departures from a best-fit spherical surface), or any appropriate combination thereof. In some embodiments, the use of a free-form surface may provide greater control over the location, number, and size of aberrations in the image projected by the optical system (e.g., improved optical transfer functions from displayed image to projected image).

In some embodiments, the display, the first mirror, and the second mirror may be disposed so as to generally face the reflective polarizer. In some embodiments, the reflective polarizer, the display, and the first and second mirrors generally define an internal space therebetween, wherein one of the first and second mirrors is convex toward the internal space and the other of the first and second mirrors is concave toward the internal space. In some embodiments, at least one of the first and second mirrors may be a reflective polarizer.

In some embodiments, the display may be adapted to emit an image for viewing by a viewer. The display may be a picture generating unit, or PGU (e.g., a liquid crystal display or LED display), which generates an image for eventual display to the viewer (e.g., a driver of a vehicle containing the HUD). In some embodiments, the emitted image may be transmitted by the reflective polarizer after being reflected once by each of the first and second mirrors.

In some embodiments, the optical system may also include one or more quarter wave plates, positioned within the system such that the polarization of the emitted and reflected image changes from one state to another as needed to either be transmitted by or reflected by the reflecting polarizer. In some embodiments, the arrangement of the display, the reflective polarizer, and the first and second mirrors, including the angle of tilt of each component, may be such that the amount of volume required by the optical system is minimized. In other words, the components of the system may be arranged such that the reflected rays which define the emitted image passes substantially through a space or volume through which the same image rays passed before reflection (i.e., reusing common areas or volumes through which image rays have previously passed to the extent possible).

In some embodiments, the optical system has an optical axis, and an image ray emitted by the display and propagating along the optical axis may be substantially normally incident on the first mirror after being reflected by the reflective polarizer and the second mirror. In some embodiments, the optical axis may make a first oblique angle with the display and a second oblique angle with the reflective polarizer. In some embodiments, the optical axis is substantially normally incident on only one of the first and second mirrors. In some embodiments, the reflective polarizer may make an angle $\theta_R$ with the optical axis such that, when $\theta_R$ is changed by at least 5 degrees, the ratio of A4/A3 changes by less than about 30%.

In some embodiments, a midplane may be defined by intersection points between the optical axis and each of the display, the reflective polarizer, and the second mirror. In some embodiments, the midplane may include one-pass through four-pass regions having respective areas, A1 through A4. In some embodiments, and for image rays emitted from the display and propagating along and in the midplane, and prior to being incident on the reflective polarizer for a second time: the one-pass region includes portions of the emitted image rays that pass at least one time across the one-pass region, the two-pass region includes portions of the emitted image rays that pass at least two times across the two-pass region, the three-pass region includes portions of the emitted image rays that pass at least three times across the three-pass region, and the four-pass region includes portions of the emitted image rays that pass four times across the four-pass region, such that the ratio A4/A3 is between approximately 0.15 and approximately 0.40.

According to some aspects of the present description, an optical system (e.g., a heads-up display) may include a display (i.e., a picture-generating unit, or PGU), a reflective polarizer, a first mirror, and a second mirror generally disposed on different side-faces, and between opposing parallel end-faces, of a right rectangular prism and substantially facing an interior space of the right rectangular prism. In some embodiments, the display and the reflective polarizer may be disposed along two adjacent side-faces of the right rectangular prism. In some embodiments, the display and the second mirror may substantially face each other, each being disposed on an opposite end-face, and the reflective polarizer and the first mirror may substantially face each other, each being disposed on an opposite side-face. In some embodiments, the display, the reflective polarizer, the first mirror, and the second mirror may be disposed at an angle to but generally facing the corresponding end-face or side-face of the rectangular prism to which they are adjacent.

In some embodiments, an image emitted by the display may be transmitted by the reflective polarizer for viewing by a viewer after the emitted image is reflected by each of the reflective polarizer and the first and second mirrors. For example, in some embodiments, image rays emitted by the display may first impinge on and be reflected by the second mirror, where they are reflected to impinge on and be reflected by the second polarizer, where they are reflected to impinge on and be reflected by the first mirror, finally passing through the reflective polarizer for presentation to a viewer (e.g., projected onto a windshield to be viewed by a driver of a vehicle.) Other embodiments and other configurations may be possible. In some embodiments, the optical system may also include one or more quarter wave plates, positioned within the system such that the polarization of the emitted and reflected image changes from one state to another as needed to either be transmitted by or reflected by the reflecting polarizer.

According to some aspects of the present description, an optical system may include a reflective polarizer, and a display, a first mirror, and a second mirror disposed on a same side of the reflective polarizer. For normally incident light and for at least one wavelength in a range extending from about 450 nm to about 600 nm, the reflective polarizer transmits at least 80% of the incident light having a first polarization state and reflects at least 80% of the incident light having an orthogonal second polarization state, and each of the first and second mirrors reflects at least 80% of the incident light for at least one of the first and second polarization states. The display is adapted to emit a central image ray, which propagates along and in a central plane and which is transmitted by the reflective polarizer for viewing by a viewer after being reflected once by each of the first and second mirrors. The central plane includes three-pass and four-pass regions having respective areas A3 and A4. For emitted image rays emitted from the display and propagating along and in the central plane, and prior to being incident on the reflective polarizer for a second time: the three-pass region includes portions of the emitted image rays that pass at least three times across the three-pass region, and the four-pass region comprises portions of the emitted image rays that pass four times across the four-pass region, such that the ratio A4/A3 is between approximately 0.15 and approximately 0.40.

In some embodiments, for normally incident light and for at least one wavelength in the range extending from about 450 nm to about 600 nm, at least one of the first and second mirrors may transmit at least 80% of the incident light for one of the first and second polarization states.

In some embodiments, for normally incident light and for each wavelength in at least a 20 nm wide wavelength range (i.e., a band of wavelengths at least 20 nm wide) between about 450 nm to about 600 nm, at least one of the first and second mirrors may transmit at least 80% of the incident light for one of the first and second polarization states.

In some embodiments, one or both of the first and second mirrors may substantially reflect all incident light, regardless of the polarization of the light. In some embodiments, at least one of the first mirror and second mirror may be a reflective polarizer. That is, in some embodiments, one or both of the first and second mirrors may substantially reflect incident light in the first polarization state, and substantially transmit incident light in the second polarization state. In other embodiments, one or both of the first and second mirrors may substantially reflect incident light in the second polarization state, and substantially transmit incident light in the first polarization state.

In some embodiments, at least one of the first and second mirrors may transmit at least 40% of normally incident light for at least one wavelength in a range from about 700 nm to about 2500 nm for each of the first and second polarization states. For example, at least one of the first and second mirrors may be a "cold mirror" (i.e., a mirror technology used to reflect and possibly focus human-visible wavelengths of light while transmitting at least some infrared wavelengths. In some optical systems (e.g., a heads-up display, or HUD), sunlight may come through the windshield and enter the HUD system. The solar spectrum at Earth's surface includes infrared light (approximately 700 nm to 2500 nm wavelength) of integrated energy roughly equal to the human-visible light energy. This human-visible plus infrared radiation can cause undesired heating and even physical damage of components within the HUD. In some preferred HUD designs, the use of a cold mirror can ensure the infrared components of the radiation are absorbed in a preferred location without jeopardizing sensitive components. In some embodiments, a cold mirror may be a multilayer article or film, fabricated by vacuum deposition of inorganic layers, or by precision formation of polymeric layers, or by any other appropriate manufacturing processes.

Figure 1:
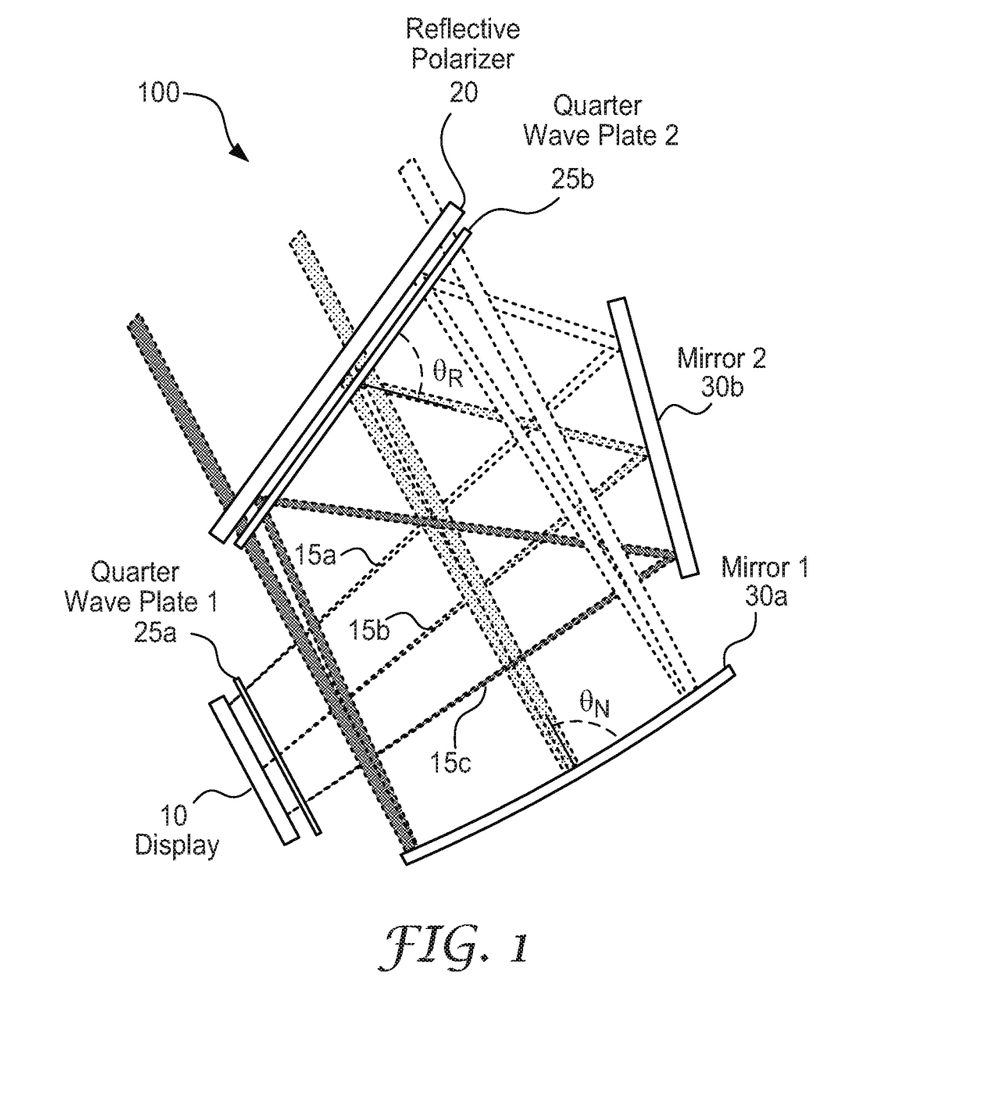
FIG. 1 is a cross-sectional view of a compact heads-up display in accordance with an embodiment described herein.

Turning now to the figures, FIG. 1 is a cross-sectional view of an optical system, such as a compact heads-up display (HUD), in accordance with an embodiment described herein. In some embodiments, the HUD 100 includes a display 10, a first mirror 30a, a second mirror 30b, and a reflective polarizer 20. In some embodiments, the display 10 may be a liquid crystal display (LCD) or a light-emitting diode (LED) display, or any other appropriate picture generating unit (PGU) capable of displaying an image. The image is emitted from display 10 in the form of emitted image rays 15 (including, for example, rays 15a, 15b, and 15c). In some embodiments, to direct the emitted image from display 10 to a point where it may be viewed by a viewer (e.g., seen by a vehicle operator projected on a windshield), while minimizing the amount of volume required to create the proper focal length for the projected image, emitted image rays 15 may be directed first to second mirror 30b, where at least some of the image rays 15 are reflected and redirected to reflective polarizer 20. The image rays 15 may then be reflected and redirected to first mirror 30a.

In some embodiments, HUD 100 may define an optical axis such that an image ray (e.g., image ray 15b) emitted by display 10 propagates along the optical axis and strikes first mirror 30a at an angle $\theta_N$ which is substantially normal with first mirror 30a. Image rays 15 are then reflected back toward reflective polarizer 20, where they are allowed to pass through reflective polarizer 20 to be projected onto a windshield or similar surface for display to a viewer/operator. In some embodiments, reflective polarizer 20 makes an angle $\theta_R$ with the optical axis, which may be changed based on design considerations to optimize the use of space within the HUD 100.

In some embodiments, a first quarter wave plate 25a and a second quarter wave plate 25b may be used to rotate or change the polarization state of emitted image rays 15 such that the image rays 15 are allowed to pass through (be transmitted by) reflective polarizer 20 when in a first polarization state and are reflected when striking reflective polarizer 20 in a second, different polarization state. In some embodiments, such as the embodiment of FIG. 6, a single quarter wave plate may be sufficient to change the polarization state of the emitted image rays 15. The alternate embodiment of FIG. 6 will be described in additional detail herein.

In some embodiments, reflective polarizer 20 may be designed such that it reflects at least 80% of incoming image rays 15 of a first polarization state, and transmits (allows to pass) at least 80% of incoming image rays 15 of a second polarization state. In other words, the reflective polarizer 20 may be either substantially reflective or substantially transmissive based on the polarization of the incoming image rays 15.

Reflective polarizer 20 may provide substantially complete transmission of one polarization of light (e.g., s-polarization) while providing selective reflection and transmission of the other polarization (e.g., p-polarization). In some embodiments, the reflective polarizer 20 may be a multilayer optical film (MOF). In such embodiments, the MOF may be a multilayer stack of alternating materials such as described in U.S. Pat. No. 5,882,774 (Jonza et al.), incorporated herein by reference. The polarization-specific reflection properties can be made wavelength specific by appropriate layer thickness selection, so that the reflective polarizer 20 is substantially transparent for all but the selected wavelengths. The selected wavelengths may be a single narrow band, multiple narrow bands, or a broad band. Any suitable degree of reflectivity for the chosen band of wavelengths can be achieved by control of the layer-to-layer refractive index differences and the total number of layers in the reflective polarizer 20. Reflective polarizer 20 can be fabricated from tens or hundreds of co-extruded polymer layers that are substantially non-absorbing in the visible and near infrared wavelengths, such that the sum of reflectivity and transmissivity for the polarizer is 100%.

Figure 2:
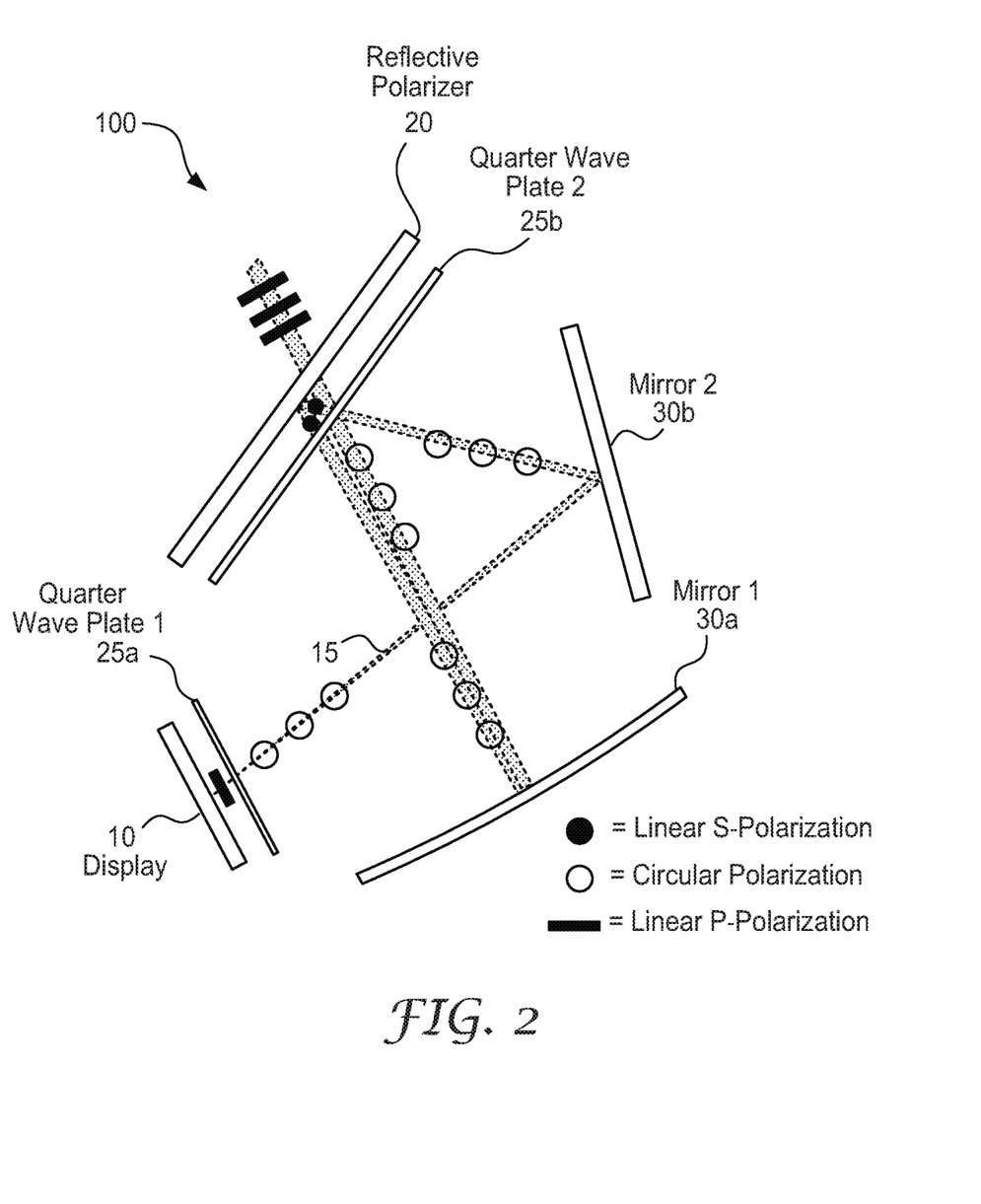
FIG. 2 is a cross-sectional view of a compact heads-up display showing an optical axis in accordance with an embodiment described herein.

FIG. 2 is a cross-sectional view of a compact heads-up display 100 showing how quarter wave plates may be used to change the polarization of image rays, according to some embodiments described herein. Many of the elements of FIG. 2 are common to the like-numbered elements of FIG. 1 and may be understood from the foregoing description of these components related to FIG. 1. For simplicity, a single emitted image ray 15 is shown. However, in practice, a plurality of image rays defining an image emitted by display 10 may be present.

In some embodiments, image ray 15 may be emitted from display 10 with a first polarization type (e.g., linear P-polarization, or P-pol). As image ray 15 passes through first quarter wave panel 25a, the polarization state changes to an intermediate polarization state (e.g., circular polarization). Image ray 15 then strikes and is reflected from the second mirror 30b and is redirected to reflective polarizer 20. Before striking the reflective polarizer 20, image ray 15 passes through a second quarter wave plate 25b, where it is changed to a second polarization type (e.g., linear S-polarization, or S-pol). The image ray 15 reflects from reflective polarizer 20, which substantially reflects light of the second polarization type, and passes a second time through the second quarter wave plate 25b, where the polarization type changes back to the intermediate type (e.g., circular polarization). Finally, image ray 15 strikes the first mirror 30a at an angle that is substantially normal to first mirror 30a, and is reflected back toward the reflective polarizer 20. In some embodiments, image ray 15 makes a final pass through second quarter wave plate 25b, causing the polarization state to change back to the first polarization state (e.g., P-pol), allowing it to pass through reflective polarizer 20, which substantially transmits the first polarization type.

Figure 6:
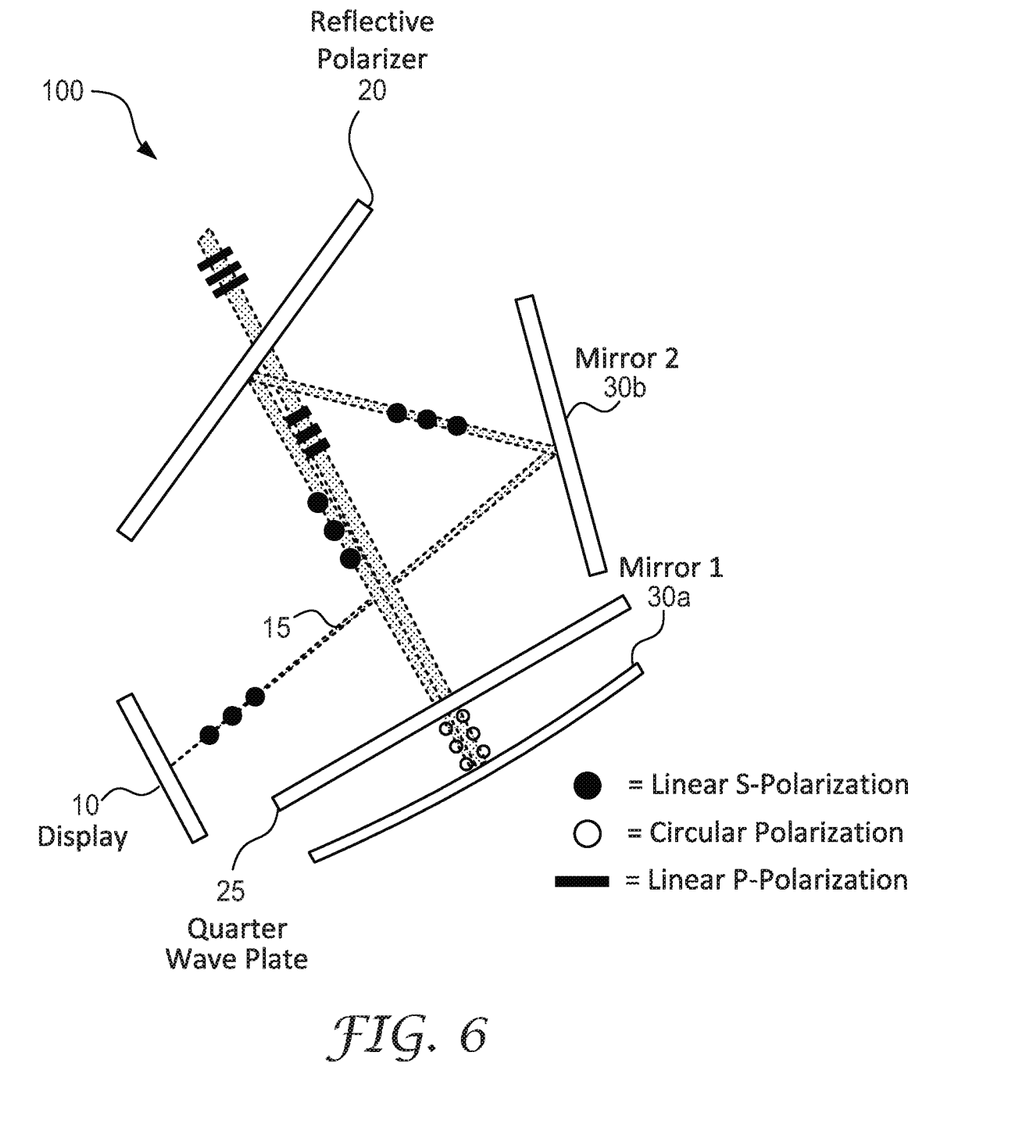
FIG. 6 is a cross-sectional view of a compact heads-up display in accordance with an alternate embodiment described herein.

It should be noted that the polarization states illustrated in FIG. 2 are examples only, and can be varied without deviating from the concepts described herein. For example, the first polarization type may be S-pol and the second polarization type may be P-pol. In some embodiments, a different number or type of polarization changing devices (e.g., quarter wave plates) may be used to achieve similar results. For example, FIG. 6 illustrates an embodiment where a single quarter wave plate is used to change polarization states. Also, the angles and configurations of the optical components shown in FIGS. 1 and 2 are examples only and may be modified as necessary to achieve results fitting the application. For example, in some embodiments, the relative positions of the display 10 and second mirror 30b may be swapped. Other configurations and embodiments may be possible.

Figure 3A:
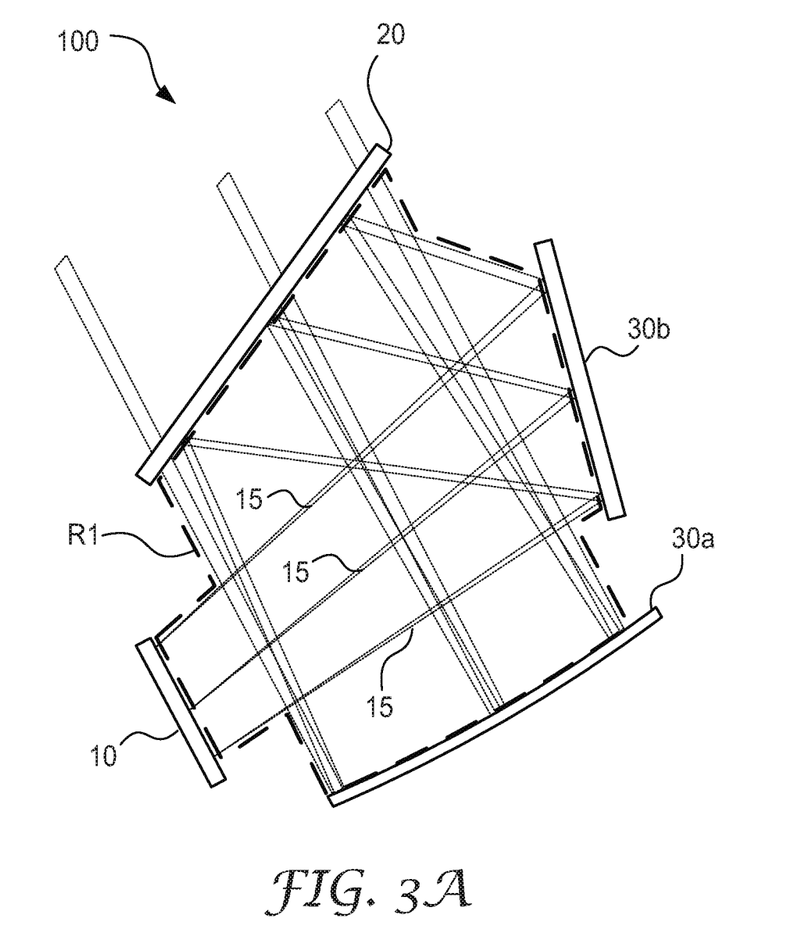
FIGS. 3A-3D depict various example cross-sectional areas defined for a compact heads-up display in accordance with an embodiment described herein.

FIGS. 3A-3D depict simplified cross-sectional illustrations of HUD 100 of FIGS. 1 and 2, defining several cross-sectional regions defined by subsets of image rays traveling through the HUD. FIG. 3A shows example region R1, shown outlined by a dashed line, wherein the region is defined by those portions of emitted image rays 15 that pass at least once across the R1 region. It should be noted that "one-pass" region R1 is a two-dimensional, cross-sectional representation of a larger three-dimensional volume that would be defined by a first pass of image rays 15 through an actual HUD 100.

Figure 3B:
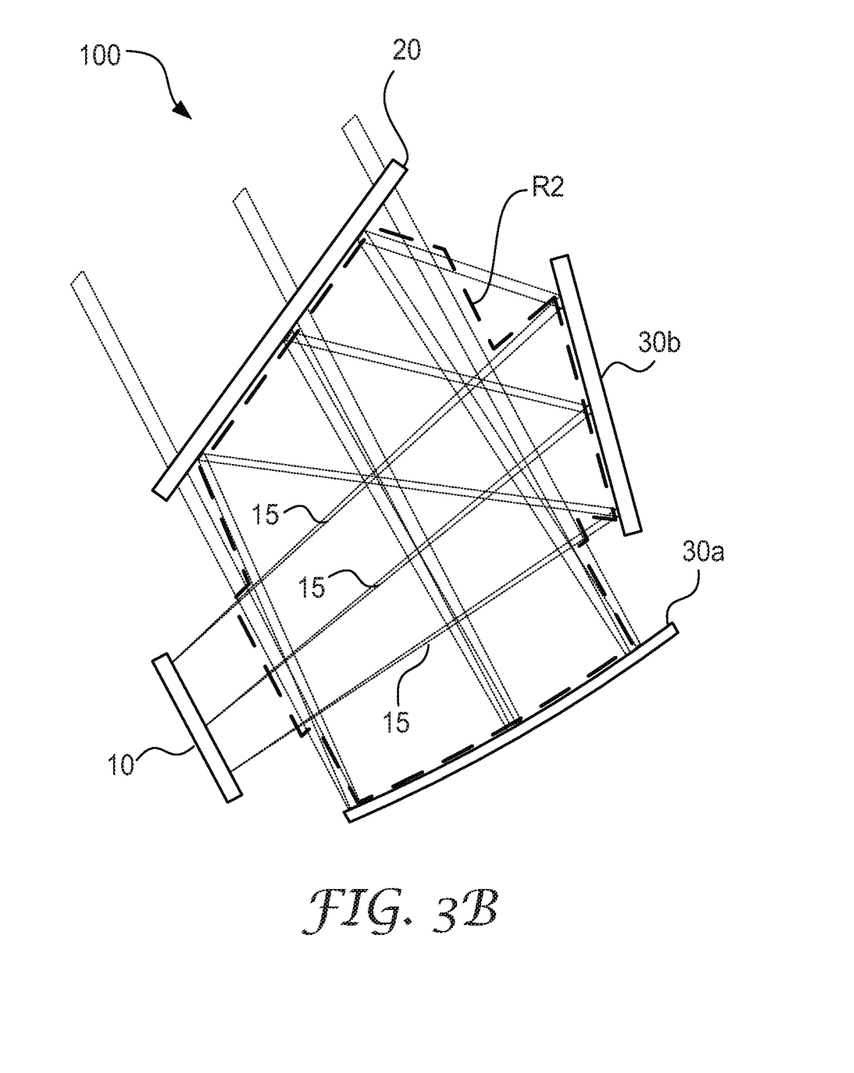
Figure 3C:
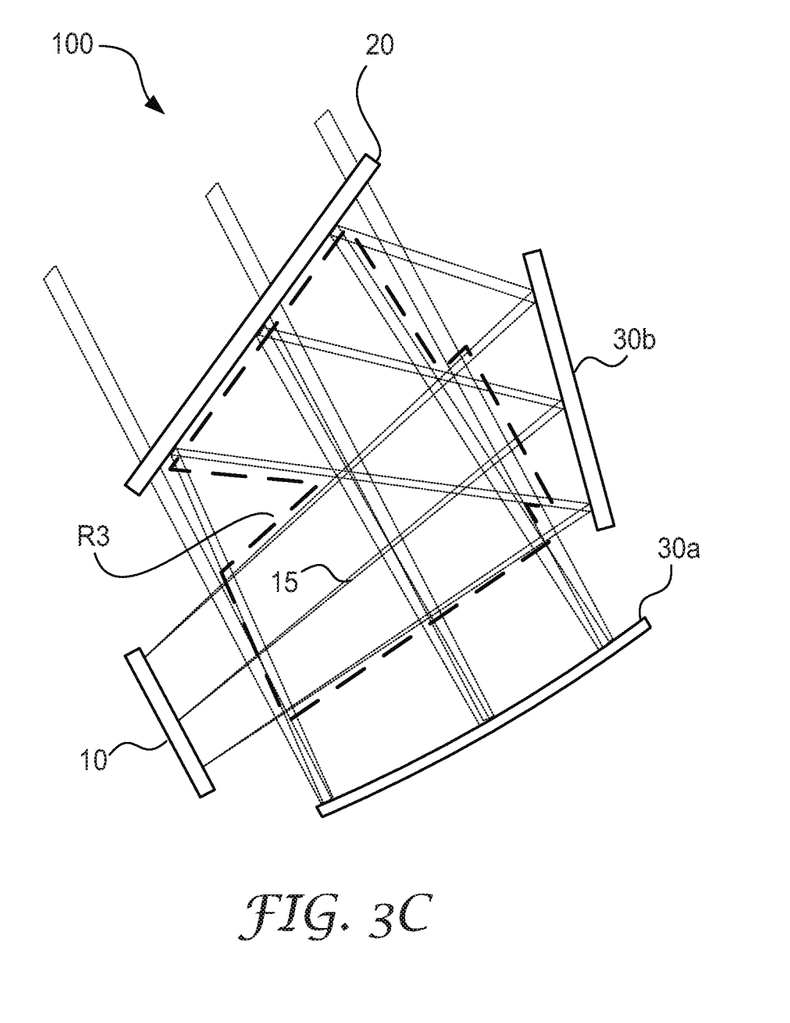
Figure 3D:
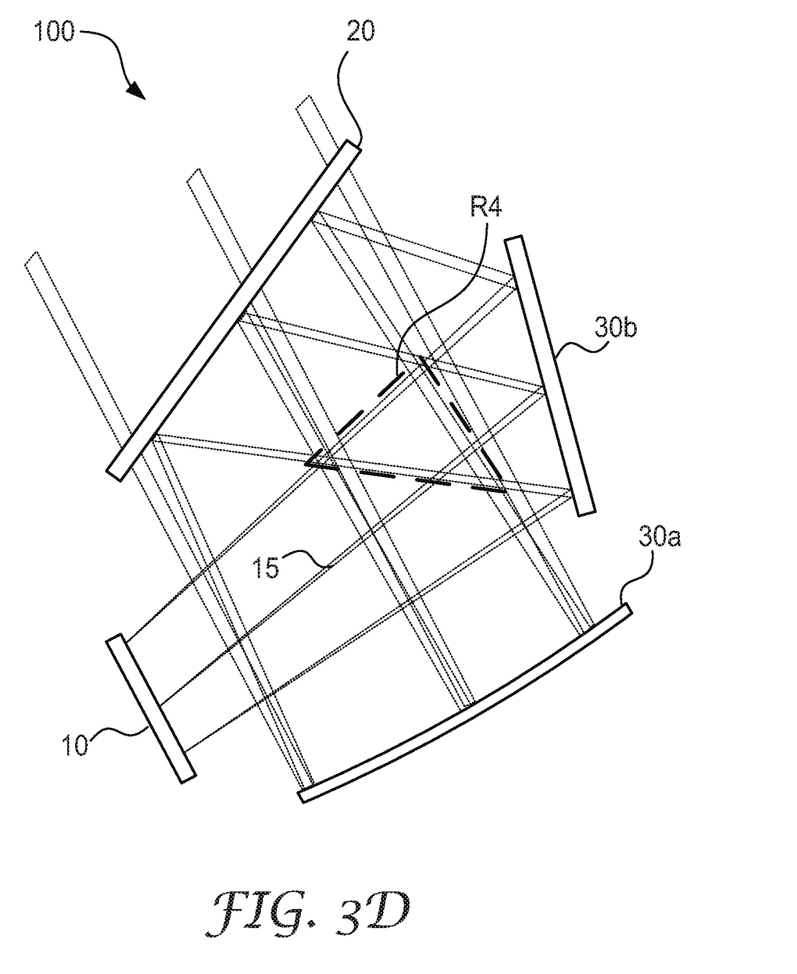

FIG. 3B shows example region R2, shown outlined by a dashed line, wherein the region R2 is defined by those portions of emitted image rays 15 that pass at least twice across the R2 region. In other words, region R2 is a sub-region of region R1, defining only the region where image rays have passed at least twice through that region. Similarly, FIG. 3C shows example region R3, shown outlined by a dashed line, wherein the region R3 is defined by those portions of emitted image rays 15 that pass at least three times across the R3 region. In other words, region R3 is a sub-region of both regions R1 and R2, defining only the region where image rays have passed three times through that region. Finally, FIG. 3D shows example region R4, shown outlined by a dashed line, wherein the region R4 is defined by those portions of emitted image rays 15 that pass at least four times across the R4 region. In other words, region R4 is a sub-region of regions R1, R2, and R3, defining only the region where image rays have passed four times through that region.

Figure 4:
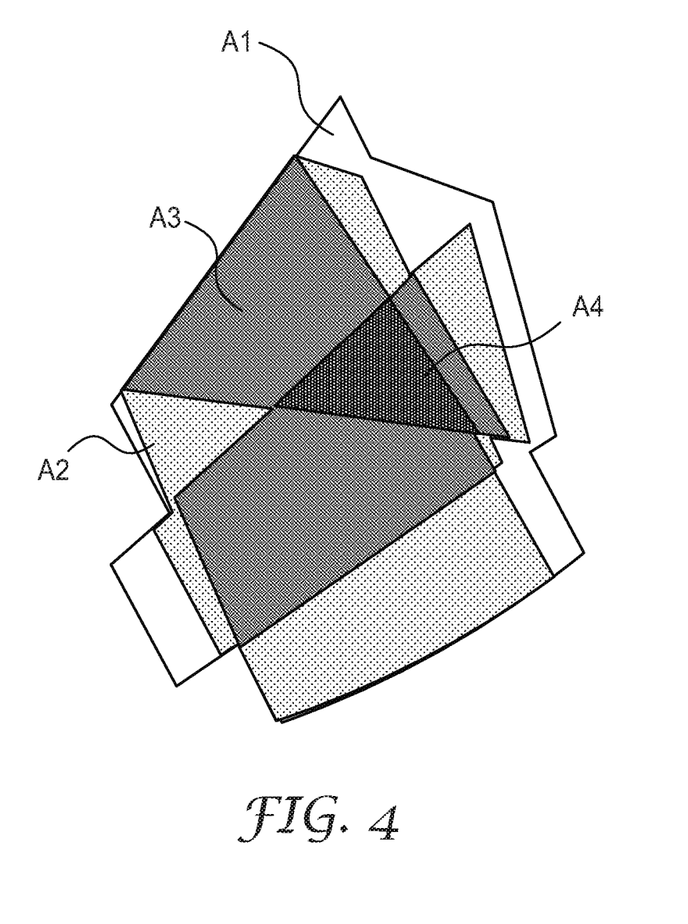
FIG. 4 illustrates the relationship of various example cross-sectional areas defined for a compact heads-up display in accordance with an embodiment described herein.
Figure 5A:
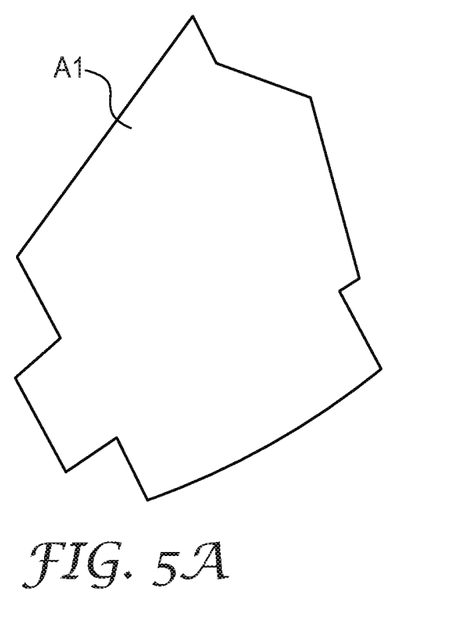
FIGS. 5A-5D depict individual example cross-sectional areas defined for a compact heads-up display in accordance with an embodiment described herein.
Figure 5B:
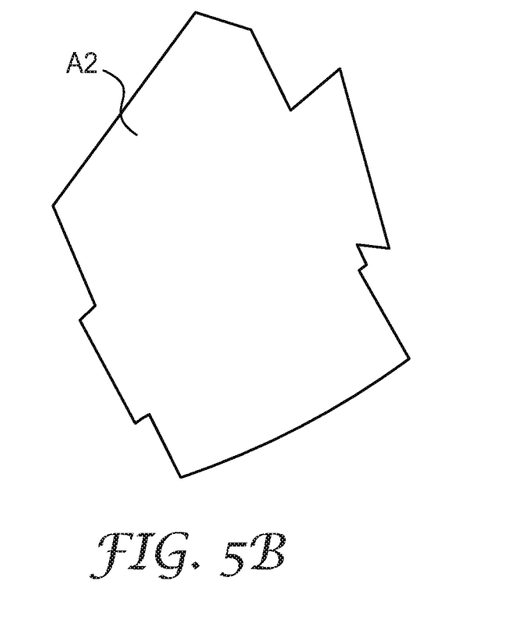
Figure 5C:
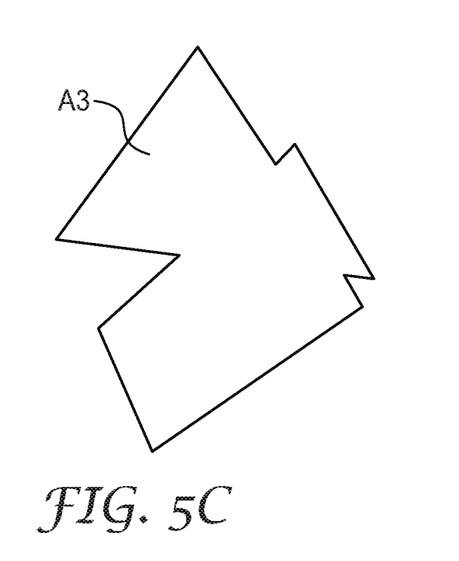
Figure 5D:
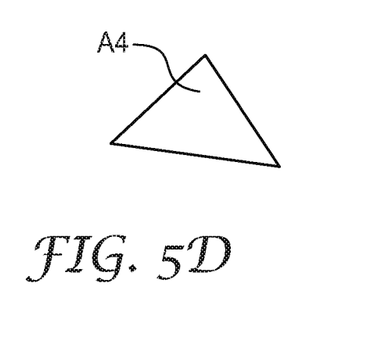

Regions R1, R2, R3, and R4 have respective areas A1, A2, A3, and A4. FIG. 4 illustrates the relationship of areas A1, A2, A3, and A4 as defined for the example HUD 100 of FIG. 1, contained and overset in a single drawing. FIGS. 5A-5D separate the three areas and display them side by side for the purposes of comparison. By comparing the ratio of areas, one can create a quantitative measure of the relative amount of "area sharing" defined by the system. That is, the size of area A2 represents the portion of area A1 that is shared by first-pass image rays and second-pass image rays, the size of area A3 represents the portion of area A1 that is shared by first-pass, second-pass, and third-pass image rays, and the size of area A4 represents the portion of area A1 that is shared by first-pass, second-pass, third-pass, and fourth-pass image rays.

The larger area A4 is relative to areas A3, A2, and A1, the higher the degree of area sharing used by the reflected image rays. It is important to note that the amount of area sharing translates into an amount of sharing of the volumetric space defined by a rectangular prism, the sides of which are roughly defined by the positions of the display, the first mirror, the second mirror, and the reflective polarizer. Less volumetric space used means a smaller, more compact HUD. The relative positions and orientations of the HUD components (e.g., display, reflective polarizer, and mirrors) may be chosen so as to maximize the ratio of A4 to A3 (as well as ratios of A4/A2 and A4/A1), optimizing the use of volumetric space. In some embodiments, the ratio A4/A3 may be between approximately 0.15 and approximately 0.40. In some embodiments, the reflective polarizer may make an angle $\theta_R$ with the optical axis of the HUD such that, when $\theta_R$ is changed by at least 5 degrees, A4/A3 changes by less than about 30%.

FIG. 6 is a cross-sectional view of an alternate embodiment of a compact optical system. Many of the elements of FIG. 6 are common to the like-numbered elements described of FIGS. 1 and 2 and may be understood from the foregoing description of these components related to those figures. In the embodiment of FIG. 6, a single quarter wave plate 25 is used instead of two separate quarter wave plates as shown in the example embodiments of FIGS. 1 and 2. In this example, image rays 15 are emitted from display 10 with a first polarization type (e.g., linear S-polarization, or S-pol). Image rays 15 strike second mirror 30b and are redirected to reflective polarizer 20. The reflective polarizer 20, which substantially reflects image rays 15 of the first polarization type, reflects the image rays 15 toward first mirror 30a. The image rays 15 pass through quarter wave plate 25, changing polarization from the first polarization type (e.g., S-pol) to an intermediate polarization type (e.g., circular polarization). Image rays 15 strike first mirror 30a and are reflected back through quarter wave plate 25, which again changes the polarization of image rays 15 to a second polarization type (e.g., linear P-polarization, or P-pol). Image rays then become incident on the reflective polarizer 20 a second time, this time with the second polarization type, and are substantially transmitted through reflective polarizer 20 to be projected onto a surface (e.g., a surface of a windshield) for viewing by a viewer/operator.

As previously noted, the polarization states illustrated in FIG. 6 are examples only and may be varied without deviating from the concepts described herein. For example, the first polarization type may be P-pol and the second polarization type may be S-pol. In some embodiments, a different number or type of polarization changing devices (e.g., quarter wave plates) may be used to achieve similar results (i.e., changing the polarization type as needed by the application).

Figure 7:
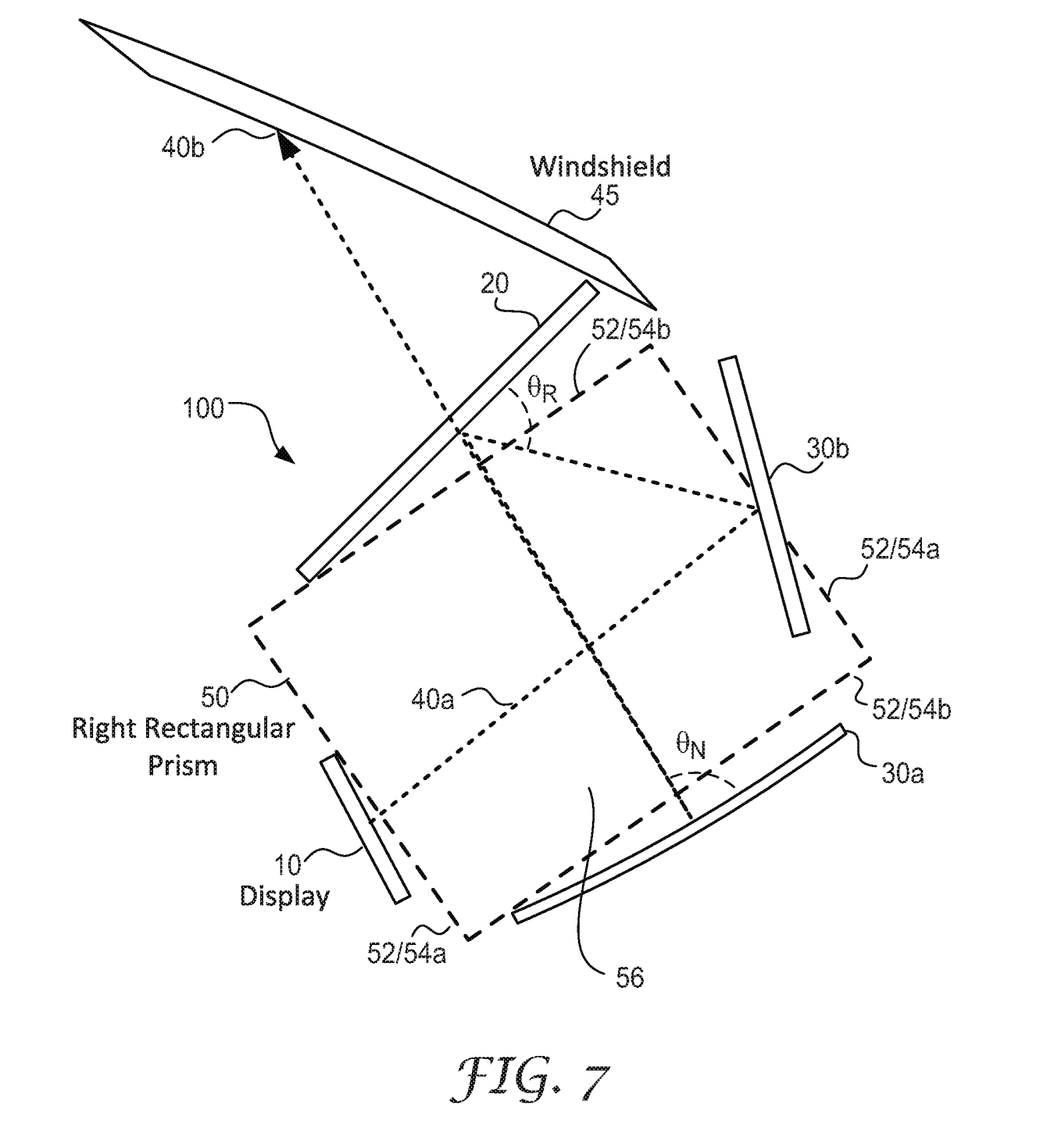
FIG. 7 is a cross-sectional view of a compact heads-up display in accordance with an embodiment described herein.

FIG. 7 is an alternate view of a compact heads-up display 100 illustrating how the optical system may define an optical axis. In some embodiments, the HUD 100 may include a display 10, a reflective polarizer 20, a first mirror 30a, and a second mirror 30b generally disposed on different side-faces 52, and between opposing parallel end-faces 54a/54b, of a right rectangular prism 50 of volumetric space, each of display 10, reflective polarizer 20, first mirror 30a, and second mirror 30b facing an interior space 56 of the right rectangular prism 50. Image rays defining an image emitted by display 10 follow an optical axis 40a though the interior space 56, and are transmitted by reflective polarizer 20 for viewing by a viewer as a projected image 40b on a surface 45 (e.g., a windshield) after the emitted image is reflected by each of the reflective polarizer 20 and the first mirror 30a and second mirror 30b. In some embodiments, the optical axis 40a is incident on first mirror 30a at an angle $\theta_N$ that is substantially normal to mirror 30a. The reflective polarizer is disposed at an angle $\theta_R$ with the optical axis 40a.

It should be noted that each face of rectangular prism 50 is considered a side-face 52 as well as an end-face 54. The term side-face shall be used to refer generally to any of the four sides of rectangular prism 50 as depicted in FIG. 7. The term "end-face" shall be used to refer to faces which exist as a set of opposing, parallel end-faces (i.e., a set with one end-face corresponding to a first side-face, and a second end-face corresponding to the side-face directly opposite the first side-face). There are two sets of opposing, parallel end-faces, 54a and 54b.

In some embodiments, the display 10 and the reflective polarizer 20 are disposed along two adjacent side-faces 52 of the right rectangular prism. In some embodiments, the display 10 and the second mirror 30b substantially face each other on opposing parallel end-faces 54a, and the reflective polarizer 20 and the first mirror 30a substantially face each other on opposing parallel end-faces 54b.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system, comprising:
a reflective polarizer; and
a display, a first mirror, and a second mirror disposed on a same side of the reflective polarizer, such that for a light that is normally incident to any of the display, first mirror, and second mirror, and for at least one wavelength in a range extending from about 450 nm to about 600 nm:
the reflective polarizer transmits at least 80% of the incident light having a first polarization state and reflects at least 80% of the incident light having an orthogonal second polarization state; and
each of the first and second mirrors reflects at least 80% of the incident light for at least one of the first and second polarization states;
the display adapted to emit an image for viewing by a viewer, the emitted image being transmitted by the reflective polarizer after being reflected once by each of the first and second mirrors,
the optical system having an optical axis, an image ray emitted by the display and propagating along the optical axis being substantially normally incident on the first mirror after being reflected by the reflective polarizer and the second mirror, a midplane defined by intersection points between the optical axis and the display, the reflective polarizer, and the second mirror, the midplane comprising one-pass through four-pass regions having respective areas A1 through A4, such that for emitted image rays emitted from the display and propagating along and in the midplane and prior to being incident on the reflective polarizer for a second time:

the one-pass region comprises portions of the emitted image rays that pass at least one time across the one-pass region;

the two-pass region comprises portions of the emitted image rays that pass at least two times across the two-pass region;

the three-pass region comprises portions of the emitted image rays that pass at least three times across the three-pass region; and the four-pass region comprises portions of the emitted image rays that pass four times across the four-pass region, 0.15≤A4/A3≤0.40.

2. The optical system of claim 1, wherein each of the display, the first mirror, and the second mirror generally faces the reflective polarizer.

3. The optical system of claim 1, wherein the reflective polarizer makes an angle $\theta_R$ with the optical axis, such that when $\theta_R$ is changed by at least 5 degrees, A4/A3 changes by less than about 30%.

4. The optical system of claim 1, wherein at least one of the reflective polarizer, the first mirror, and the second mirror is curved.

5. The optical system of claim 1, wherein the reflective polarizer, the display, and the first and second mirrors generally define an internal space therebetween, wherein one of the first and second mirrors is convex toward the internal space and the other of the first and second mirrors is concave toward the internal space.

6. The optical system of claim 1, wherein the optical axis makes a first oblique angle with the display and a second oblique angle with the reflective polarizer.

7. The optical system of claim 1, wherein the optical axis is substantially normally incident on only one of the first and second mirrors.

8. An optical system, comprising:
a reflective polarizer; and
a display, a first mirror, and a second mirror disposed on a same side of the reflective polarizer, such that for a light that is normally incident to any of the display, first mirror, and second mirror, and for at least one wavelength in a range extending from about 450 nm to about 600 nm:
the reflective polarizer transmits at least 80% of the incident light having a first polarization state and reflects at least 80% of the incident light having an orthogonal second polarization state; and
each of the first and second mirrors reflects at least 80% of the incident light for at least one of the first and second polarization states;
the display adapted to emit a central image ray propagating along and in a central plane and being transmitted by the reflective polarizer for viewing by a viewer after being reflected once by each of the first and second mirrors, the central plane comprising third- and four-pass regions having respective areas A3 and A4, such that for emitted image rays emitted from the display and propagating along and in the central plane and prior to being incident on the reflective polarizer for a second time:
the three-pass region comprises portions of the emitted image rays that pass at least three times across the three-pass region; and
the four-pass region comprises portions of the emitted image rays that pass four times across the four-pass region, 0.15≤A4/A3≤0.40.

9. The optical system of claim 8, wherein at least one of the first and second mirrors is a reflective polarizer.

10. The optical system of claim 8, wherein for normally incident light and for at least one wavelength in the range extending from about 450 nm to about 600 nm, each of the first and second mirrors reflects at least 80% of the incident light for each of the first and second polarization states, and at least one of the first and second mirrors also transmits at least 40% of normally incident light for at least one wavelength in a range from about 700 nm to about 2500 nm for each of the first and second polarization states.

11. The optical system of claim 8, wherein for normally incident light and for each wavelength in at least a 20 nm wide wavelength range 450 nm to about 600 nm, each of the first and second mirrors reflects at least 80% of the incident light for each of the first and second polarization states, and at least one of the first and second mirrors also transmits at least 40% of normally incident light for at least one wavelength in a range from about 700 nm to about 2500 nm for each of the first and second polarization states.

12. The optical system of claim 8, such that for normally incident light and for at least one wavelength in the range extending from about 450 nm to about 600 nm, at least one of the first and second mirrors transmits at least 80% of the incident light for one of the first and second polarization states.

13. The optical system of claim 12, wherein the at least one of the first and second mirrors also transmits at least 40% of normally incident light for at least one wavelength in a range from about 700 nm to about 2500 nm for each of the first and second polarization states.

14. The optical system of claim 8, wherein for normally incident light and for each wavelength in at least a 20 nm wide wavelength range between about 450 nm to about 600 nm, at least one of the first and second mirrors transmits at least 80% of the incident light for one of the first and second polarization states.

15. The optical system of claim 14, wherein the at least one of the first and second mirrors also transmits at least 40% of normally incident light for at least one wavelength in a range from about 700 nm to about 2500 nm for each of the first and second polarization states.

16. An optical system comprising a display, a reflective polarizer, a first mirror, and a second mirror generally disposed on different side-faces, and between opposing parallel end-faces, of a right rectangular prism and facing an interior space of the right rectangular prism, an image emitted by the display transmitted by the reflective polarizer for viewing by a viewer after the emitted image is reflected by each of the reflective polarizer and the first and second mirrors, wherein the display and the reflective polarizer are disposed along two adjacent side-faces of the right rectangular prism, and wherein the angle of tilt of each component is such that an amount of volume required by the optical system is minimized.

17. The optical system of claim 16, wherein the display and the second mirror substantially face each other, and the reflective polarizer and the first mirror substantially face each other.

* * * * *